March 3, 1959 J. E. SCHILLING 2,875,594
DIRT TRAP FOR REFRIGERATING SYSTEM
Filed April 19, 1956 2 Sheets-Sheet 1

INVENTOR
JOHN E. SCHILLING,
BY
ATTORNEYS

March 3, 1959 J. E. SCHILLING 2,875,594
DIRT TRAP FOR REFRIGERATING SYSTEM
Filed April 19, 1956 2 Sheets-Sheet 2

INVENTOR
JOHN E. SCHILLING,
BY
ATTORNEYS

United States Patent Office 2,875,594
Patented Mar. 3, 1959

2,875,594

DIRT TRAP FOR REFRIGERATING SYSTEM

John E. Schilling, Indianapolis, Ind.

Application April 19, 1956, Serial No. 579,308

3 Claims. (Cl. 62—303)

This invention relates to improvements in dirt traps of the character used in the water circulating systems of refrigeration and air conditioning plants or circuits such as are normally employed for household, building and other uses.

It has been the practice in recent years of providing cooling towers for the water that is circulated to the condenser in a refrigeration or air conditioning system. Such a cooling tower is usually located on the roof of a building in an exposed position in the atmosphere, where it is subject to the collection therein of leaves, dirt, silt, ash, etc. The water is sprayed over baffles for cooling purposes and, due to the exposed location thereof, such foreign matter is often picked up by the sprayed water thus circulated through the tower.

The foreign matter contained in the water from the cooling tower would lodge in the condenser, if directed thereto in the normal manner used heretofore, which interferes with the condenser action, and causes clogging therein, that is highly objectionable. Attempts have been made heretofore to dissipate the effects thereof by the use of chemicals, but this has been unsatisfactory.

One object of this invention is to overcome these objections by providing for the removal of the foreign matter from the water during passage thereof from the cooling tower to the condenser in a refrigeration or air conditioning system.

Another object of the invention is to provide a dirt trap wherein the foreign matter is removed by precipitation between the cooling tower and the condenser.

Still another object of the invention is to improve the construction of a dirt trap which will remove foreign matter from water circulated therethrough by precipitation and straining, in a simple and inexpensive construction that is easily installed and readily maintained in a refrigeration and air conditioning system.

These objects may be accomplished, according to one embodiment of the invention, by connecting a dirt trap in the water circulating line between the cooling tower and condenser of a refrigeration or air conditioning system. The dirt trap is constructed so as to check the flow of the water to allow the dirt to drop out by precipitation, but provision is made for screening out heavy materials such as leaves, paper, etc.

The dirt trap according to this embodiment of the invention comprises a shell having an inlet and outlet adjacent its upper end, and a drop bottom door for closing the bottom thereof and which is capable of being opened to remove the foreign matter from within the shell. Intermediate the inlet and outlet of the shell is a partition which is solid in the region directly intermediate the inlet and outlet, so as to break the flow of the fluid therebetween, being in the form of a baffle at that point, but which has a section therebelow that is reticulated, such as may be formed by screen wire for screening and removing heavy materials such as leaves, paper, etc. The dirt that is carried by the water from the cooling tower is removed by precipitation in the dirt trap so that it does not reach the condenser where it would cause stoppage of the passages therein and breakdown of the system.

This embodiment of the invention is illustrated in the accompanying drawings, in which.

Figures 1, 2:
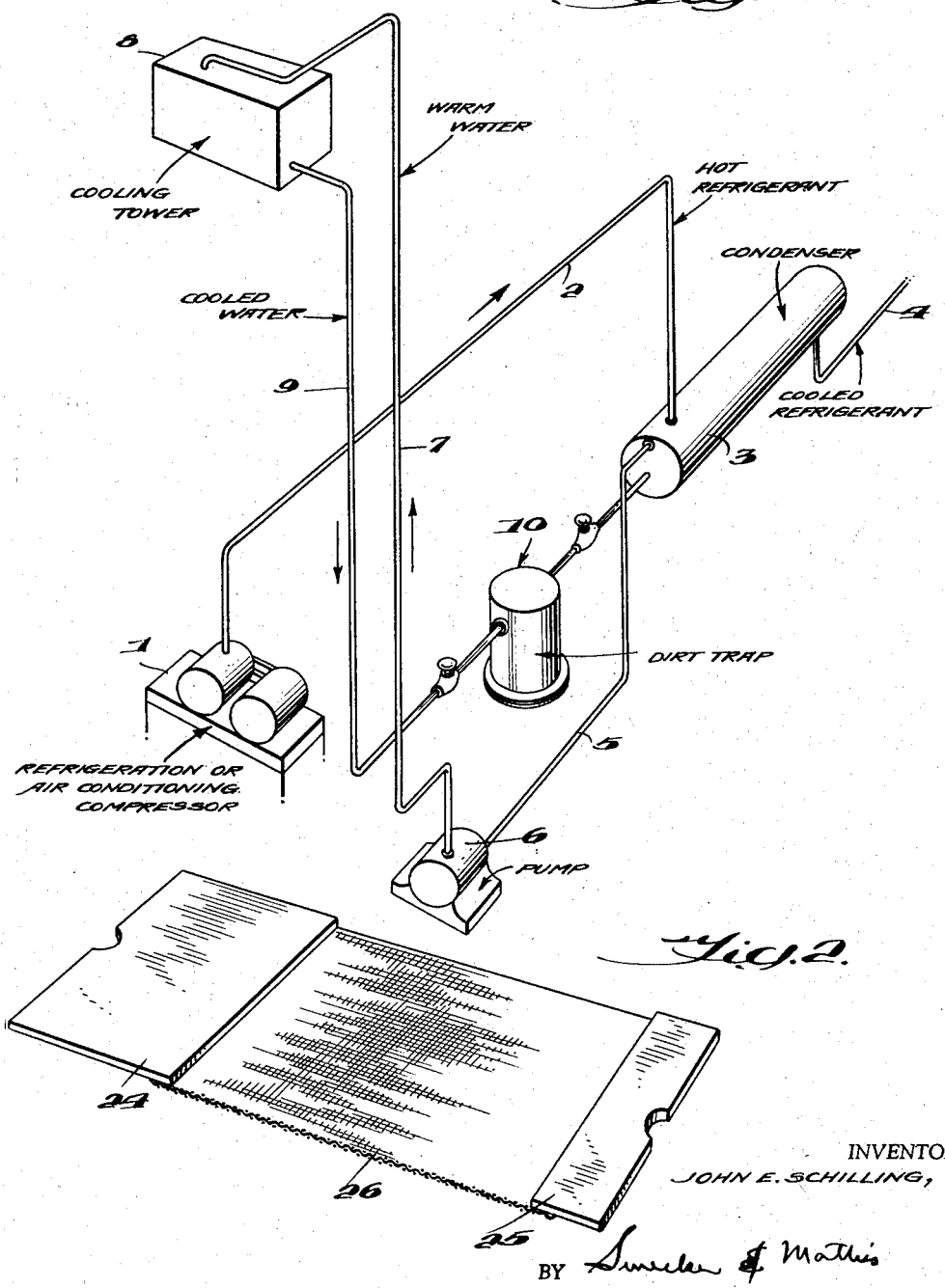
Fig. 1 is a diagrammatic view of a refrigeration or air conditioning system to which the invention is applied.
Fig. 2 is a perspective view of the baffle section of the dirt trap removed.

The invention is shown in Fig. 1 as applied to a refrigeration or air conditioning system of the compressor-condenser type. The construction and operation of such a system is well known in the art and need only be described generally herein.

The compressor of the system is illustrated generally by the numeral 1 and is connected through a pipe 2 with a condenser 3 to which hot refrigerant from the compressor is supplied by the latter. This refrigerant is then cooled in the condenser and is discharged through a pipe 4.

The cooling action in the condenser is obtained by circulating water therethrough in heat exchange relation in the condenser 3 with the refrigerant. Water is removed from the condenser through a pipe 5 leading to a pump 6 from which it is forced through a pipe 7 to a cooling tower 8. The water from the cooling tower is then returned to the condenser 3 through a pipe 9.

The cooling tower is usually located in an exposed position on top of a building or any other suitable place. It is ordinarily constructed with a series of baffles, and water from the pipe 7 is sprayed over these baffles for aerating and cooling the water in the open atmosphere. Due to the exposed position of the cooling tower, dirt, silt, ash, and other foreign matter collects on the baffles and in the cooling tower and is picked up by the water operated thereover and carried by the latter through the pipe 9.

It is desirable to remove this foreign matter before the water is directed to the condenser 3, for which purpose I have provided a dirt trap 10 in the pipe 9, intermediate the cooling tower 8 and the condenser 3, so as to remove the foreign matter before it flows with the water to the condenser, thereby preventing lodging of the dirt in the condenser, where it would coat the inside of the tubes, thus hindering heat exchange. It is preferred that the dirt be removed by precipitation, because it is often so finely divided in the water that mere screening would not be sufficiently effective.

Figure 3:
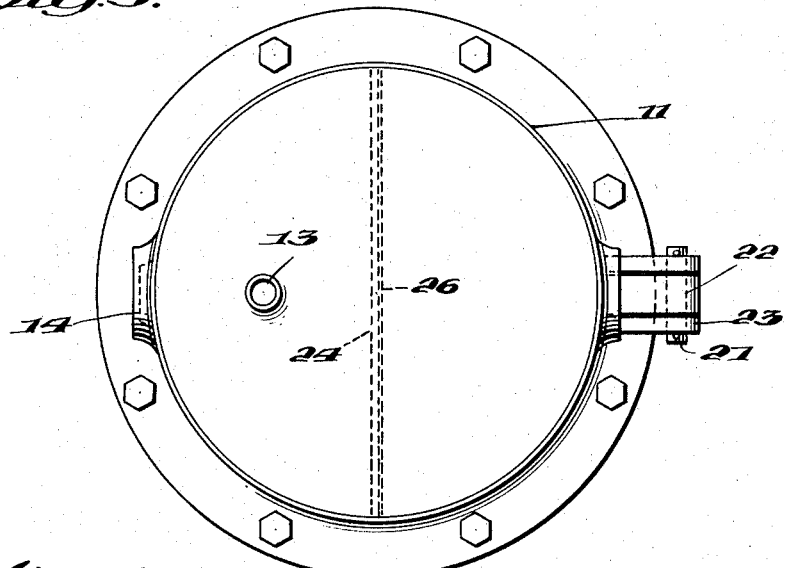
Fig. 3 is a top plan view of the dirt trap.
Figure 4:
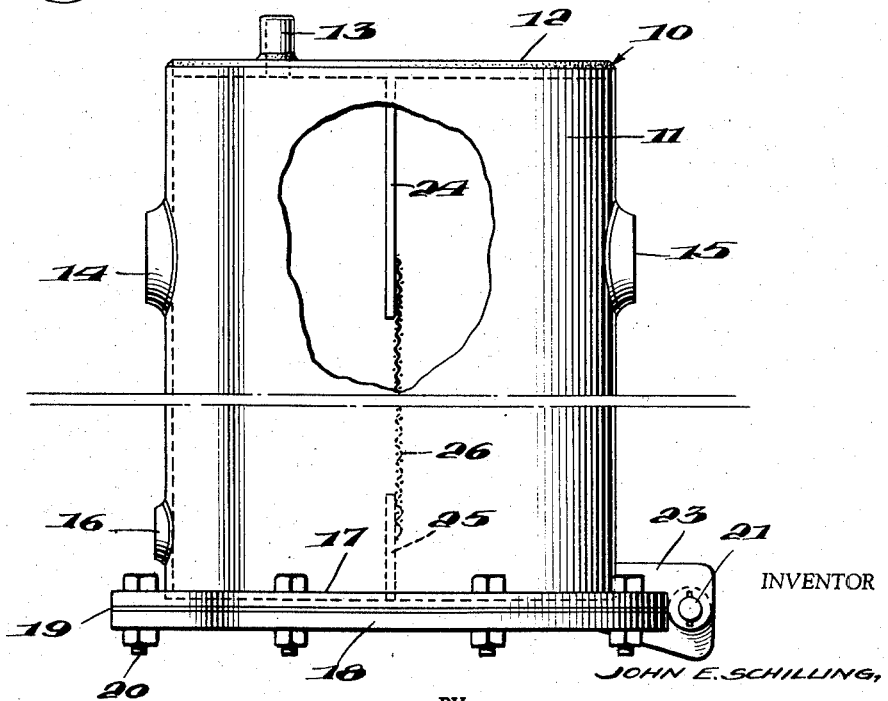
Fig. 4 is a side elevation thereof.

One form of dirt trap which I have found effective for this purpose is illustrated in Figs. 3 and 4. In this embodiment, the dirt trap 10 comprises an upright shell 11 of elongated form and having a closed top 12. The top 12 is shown as provided with a nipple 13 for a purge valve that may be opened to purge off the air when filling the trap, after which the valve is closed and remains closed during the operation of the system.

The shell 11 is provided with inlet and outlet openings 14 and 15 at opposite sides thereof, either of which may be connected with the inlet portion of the pipe 9 and the other connected with the outlet, intermediate the cooling tower 8 and the condenser 3. These openings 14 and 15 are formed in flanges secured to opposite sides of the shell 11 adjacent the upper end thereof, and may be internally threaded or otherwise provided with means for connection with the sections of the pipe 9.

The lower end portion of the shell 11 is provided with a drain opening 16 in a side thereof that may be provided with a plug or other suitable closure means. This opening 16 permits drainage of the water from the trap before the latter is opened to remove the foreign matter therefrom.

The bottom of the shell 11 is initially open, but is provided with a surrounding flange 17 thereon. Coacting with the flange 17 is a drop bottom door 18 which may be provided with a gasket 19 therebetween, if desired. The door 18 is in the form of a flat plate and is shown as connected with the flange 17 through a series of bolts 20 or other suitable fastenings for holding the door 18 effectively closed, and yet permitting opening of the door when desired.

It is preferred that the door 18 be hinged to the shell 11, so as to permit of its being dropped open upon removal of the bolts. Accordingly, I have provided a hinged connection at 21 by a pin that interconnects an ear 22 on the door 18 with ears 23 on the side of the shell 11 above the flange 17.

Extending upright in the shell 11 is a baffle structure, one form of which is shown in Fig. 2. This baffle structure extends transversely of the shell, as illustrated in Fig. 3, and throughout the height thereof, as shown in Fig. 4, intermediate the inlet and outlet openings 14 and 15.

The baffle structure comprises a baffle plate 24 at the upper end thereof and a baffle plate 25 at the lower end, which are shown as joined together by a reticulated section 26 that may be formed of screen wire. These baffle plates may be welded or otherwise secured to the shell 11 in the relation described and illustrated. The baffle plate 24 is preferably of sufficient height so as to extend downward in the shell to a point below the bottom edges of the openings 14 and 15. This relation will cause the incoming water flowing through the pipe 9 from the cooling tower 8 to be deflected by the baffle plate 24 against a direct passage to the outlet opening. As the flow is thus checked in the dirt trap 10, the slowing up thereof and the downward direction of travel of the flow will cause the dirt to drop out of the water by precipitation, as the water flows downward through the lower portion of the shell 11 and then upward to the outlet. Any large foreign matter, such as leaves, paper, etc., may be screened from the water by the screen section 26.

In this way, the trap 10 removes the foreign matter from the cooling water intermediate the cooling tower and the condenser, and thereby prevents the foreign matter from collecting in the relatively small spaces in the condenser, where it would hinder heat exchange. This has long been a serious problem with condenser-compressor systems which use cooling towers, and no satisfactory solution has been found therefor heretofore. Chemicals have been used to dissipate the effect of the dirt in the water, but these have not been satisfactory. I have found that the provision of a dirt trap which removes the dirt from the cooling water intermediate the tower and the condenser, is effective for this purpose and prevents the stoppage of the condenser, without requiring the use of chemicals. The device is extremely simple and inexpensive to build and is readily installed, without appreciable increase in cost of the system.

While the invention has been illustrated and described in one embodiment, it is recognized that variations and changes may be made therein without departing from the invention, as set forth in the claims.

I claim:

1. A dirt trap comprising an upright shell having straight sides and inlet and outlet in different sides thereof and having the entire bottom open, a drop bottom door closing the bottom and removable for removing foreign matter therefrom, a baffle and screen wire structure secured at its sides in the shell intermediate the inlet and outlet for deflecting and screening the flow therebetween, detachable fastenings connecting the drop battom door with the shell, and means hingedly connecting the drop bottom door at one side thereof with the shell.

2. A dirt trap corprising an upright shell having straight sides and inlet and outlet in different sides thereof and having the entire bottom open, a drop-bottom door closing the bottom and removable for removing foreign matter therefrom, a baffle and screen wire structure secured at its sides in the shell intermediate the inlet and outlet for deflecting and screening the flow of liquid therebetween, said structure including an imperforate plate at the lower end thereof and extending to said bottom of the shell, detachable fastening means connecting the drop-bottom door with the shell, and means hingedly connecting the drop-bottom door at one side thereof with the shell.

3. In a refrigeration or air conditioning system of the condenser-compressor type including a condenser, a cooling tower, a pipe having a pump therein for directing water from the condenser to the cooling tower, and a return pipe for directing water from the cooling tower to the compressor, the combination therewith, of a dirt trap remote from the cooling tower connected in the return pipe, said dirt trap comprising an upright shell having inlet and outlet in different sides thereof and having an open bottom, a cover closing the bottom and removable for removing foreign matter therefrom, a baffle and screen wire structure secured at its sides in the shell intermediate the inlet and outlet for deflecting and screening the flow of liquid therebetween, said structure including an imperforate plate extending from the top end of said shell and terminating below said inlet and outlet, the rest of said structure extending to the lower end of said shell and including said screen wire extending downwardly from the lower end of said plate, and detachable fastening means connecting said bottom cover with said shell.

References Cited in the file of this patent

UNITED STATES PATENTS

| Number | Name | Date |
|---|---|---|
| 326,569 | Kirklady | Sept. 22, 1885 |
| 723,556 | Stewart | Mar. 24, 1903 |
| 1,215,267 | Gunst | Feb. 6, 1917 |
| 1,568,126 | Bassett | Jan. 5, 1926 |
| 1,632,699 | Denney | June 14, 1927 |
| 2,096,112 | Kaufman | Oct. 19, 1937 |
| 2,612,359 | Simpson | Sept. 20, 1952 |
| 2,620,635 | Mautner et al. | Dec. 9, 1952 |